United States Patent [19]

Tanino et al.

[11] Patent Number: 4,728,143
[45] Date of Patent: Mar. 1, 1988

[54] DOOR FOR VEHICLE WHICH INCORPORATES LOUDSPEAKER

[75] Inventors: Masaharu Tanino; Ikuo Ishii, both of Toyota, Japan

[73] Assignee: Toyota Jidosha Kabushiki Kaisha, Aichi, Japan

[21] Appl. No.: 33,879

[22] Filed: Apr. 2, 1987

Related U.S. Application Data

[63] Continuation of Ser. No. 815,638, Dec. 31, 1985, abandoned.

[30] Foreign Application Priority Data

Jan. 10, 1985 [JP] Japan ................... 60-1550[U]

[51] Int. Cl.⁴ ................................ B60J 5/04
[52] U.S. Cl. ......................... 296/153; 296/146
[58] Field of Search ............ 296/146, 152, 153, 37.13, 296/191; 381/86, 90; 181/141, 150, 171; 297/412

[56] References Cited

U.S. PATENT DOCUMENTS

| 3,632,157 | 1/1972 | Lohr | 296/191 |
| 3,666,315 | 5/1972 | Reimann | 296/153 |
| 3,791,693 | 2/1974 | Hellriegel et al. | 296/146 |
| 3,858,679 | 1/1975 | Askins | 179/146 E |
| 4,277,653 | 7/1981 | Pawelzick | 381/86 |
| 4,473,251 | 9/1984 | Murayama | 381/86 |
| 4,580,653 | 4/1986 | Owens | 181/141 |

FOREIGN PATENT DOCUMENTS

| 142435 | 5/1985 | European Pat. Off. | 296/146 |
| 2510220 | 9/1976 | Fed. Rep. of Germany | 296/146 |
| 3037186 | 4/1982 | Fed. Rep. of Germany | 296/153 |
| 57-57687 | 4/1982 | Japan . | |
| 57-130720 | 8/1982 | Japan . | |
| 1372752 | 11/1974 | United Kingdom | 296/146 |

OTHER PUBLICATIONS

Grundig Technical Information, vol. 25, No. 5, 1978, pp. 276–286.

Primary Examiner—Dennis H. Pedder
Attorney, Agent, or Firm—Parkhurst & Oliff

[57] ABSTRACT

A door for a vehicle which incorporates a loudspeaker has a door trim which is mounted at the innermost side of the door. The door trim has a recess which extends substantially horizontally from the rear end of the door trim and at a position slightly closer to the upper end of the door than the center of the door trim and which terminates at a position slightly closer to the front end of the door than the center of the door trim. An upper raised portion is defined by a projection on the upper side of the recess, while an armrest portion is defined by a projection on the lower side of the recess. A door grip is provided at the front terminating position of the recess. The loudspeaker is disposed between the upper raised portion and the armrest portion in terms of the vertical direction of the door and adjacent to the front end of the door grip in terms of the longitudinal direction of the door so that the door grip does not interfere with a shoulder portion for reinforcing the inner panel of the door.

16 Claims, 7 Drawing Figures

DOOR FOR VEHICLE WHICH INCORPORATES LOUDSPEAKER

This is a continuation of application Ser. No. 815,638 filed Dec. 31, 1985, abandoned.

BACKGROUND OF THE INVENTION

1. Field of the Invention

The present invention relates to a vehicle, such as a passenger car or a truck, which incorporates a loudspeaker system of a radio or a stereo sound system. More particularly, the present invention pertains to a door for a vehicle which incorporates a loudspeaker.

2. Description of the Related Art

Most loudspeakers for use in vehicles have heretofore been provided in the rear panel of a vehicle. However, when the sound comes from the rear, it is not very audible for the occupant of the vehicle. It is also impossible to produce satisfactory presence with the stereo sound when the sound emanates from the rear of the listener.

In order to overcome the above problem, arrangements in which a loudspeaker is mounted in a side portion of a vehicle have recently been proposed. One of them is a device wherein a loudspeaker is incorporated in a pillar of a vehicle, such as that disclosed in the specification of Japanese Utility Model Laid-Open No. 57687/1982. However, formation of loudspeaker-mounting holes in a piller leads to a reduction in strength of the vehicle body. In addition, a vehicle which has a relatively small pillar width can only be equipped with a loudspeaker having an extremely small diameter.

Another conventional arrangement is disclosed in the specification of Japanese Utility Model Laid-Open No. 130720/1982, wherein a loudspeaker is incorporated in a door panel. With this arrangement, it is possible to equip a vehicle with a loudspeaker the diameter of which is sufficiently large to ensure satisfactory sound volume in the compartment.

The arrangement in which a loudspeaker is incorporated in a door panel, however, suffers from the following disadvantages. Namely, since the position for mounting a loudspeaker is not particularly fixed, if a loudspeaker is disposed at an inappropriate position, it may happen that an obstruction such as the body of an occupant or a seat may block the sound from the loudspeaker. In addition, incorporation of a loudspeaker in a door panel may interfere with the interior arrangement of the door, resulting in an increase in the overall width of the door, or causing other constituent portions of the door to be restricted such as to compromise the structural strength of the door.

SUMMARY OF THE INVENTION

In view of the above circumstances, it is a primary object of the present invention to provide a loudspeaker-incorporating door for a vehicle which enables an occupant to listen to the sound from a loudspeaker in a satisfactory manner irrespective of his posture and the position of the seat, and which imposes no structural restriction on other constituent portions of the door and consequently permits the door to have adequate strength whilst avoiding any increase in the overall width of the door.

To this end, the present invention provides a door for a vehicle which incorporates a loudspeaker in which the loudspeaker is disposed in a door trim and at a position which is below a raised or protruded portion formed at the upper edge of the door trim and above the armrest and still closer to the front end of the vehicle than the door grip.

According to the present invention, since the loudspeaker is provided at an intermediate portion of the door trim, the sound produced from the loudspeaker is not blocked by the occupant's legs and waist, which may be close to the lower portion of the door trim, or by the waist level portion of the seat. Further, since the loudspeaker is provided at a position on the door trim which is close to the front end of the vehicle, the sound from the loudspeaker directly enters the occupant's ears from his front without being blocked by the upper half of his body, for example, the arm placed within the arm accommodating space of the door trim, or by the backrest of the seat. In consequence, it is possible for the occupant to listen to the sound from the loudspeaker with the benefit of presence.

In addition, since a space is left inside the upper portion of the door trim, it is possible to form a shoulder for reinforcing the door inner panel in this space without any interference with the loudspeaker, thereby allowing the door to possess adequate strength. Further, since the loudspeaker is positioned below the reinforcing shoulder, there is no increase in the overall width of the door.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DETAILED DESCRIPTION OF THE PREFERRED EMBODIMENTS

A first embodiment of the present invention will be described below with reference to FIGS. 1 to 4.

Figure 1:
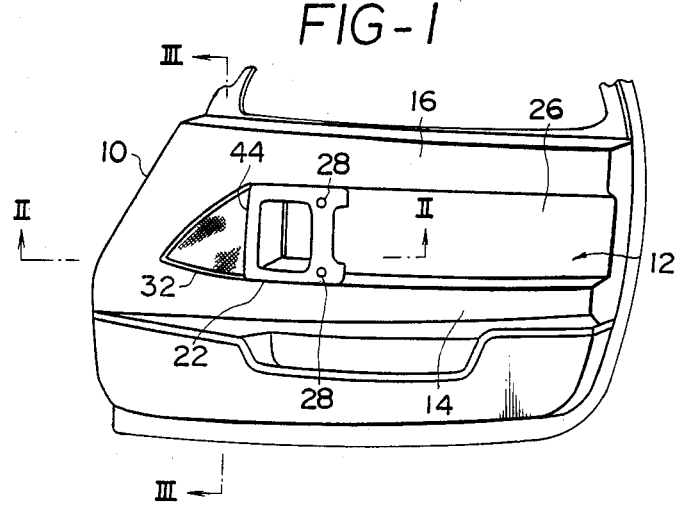
FIG. 1 shows the external appearance of a door trim in accordance with a first embodiment of the present invention.

FIG. 1 shows the external appearance of a door trim 10 of a front door of a vehicle, as viewed from the inside thereof. A recess is formed in the door trim 10 and at a position slightly closer to the upper end of the door trim 10 than the center thereof, as viewed in FIG. 1, so that the recess extends substantially horizontally from the rear end of the door trim 10 (the right-hand end thereof as viewed in FIG. 1) in terms of the longitudinal direction of the vehicle or the door and terminates at a position which is slightly closer to the front end of the door trim 10 (the left-hand end thereof as viewed in FIG. 1) than the center. This recess defines an arm accommodating space 12 which allows the occupant's arm to move therein. Thus, is is possible for the occupant to rest his arm on an armrest 14 defined by the projection on the lower side of the recess which projects inwardly of the vehicle, and to move the arm both longitudinally and laterally of the vehicle.

Figure 3:
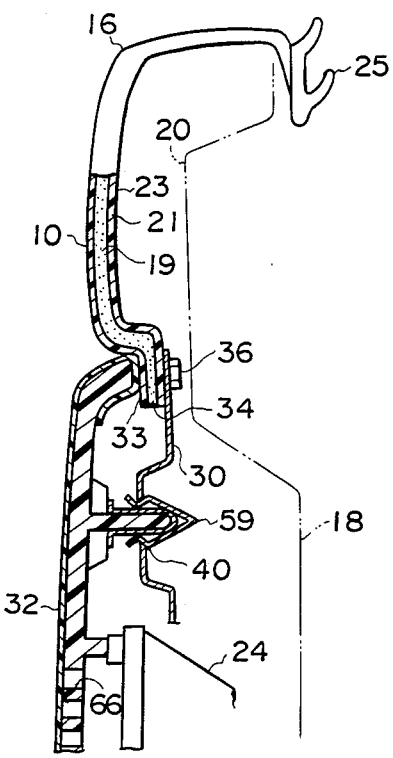
FIG. 3 is a fragmentary sectional view taken along the line III—III of FIG. 1.

The projection on the upper side of the arm accommodating space 12, that is, the recess, defines a raised or protruded portion 16 for covering a shoulder 20 for reinforcement which is formed at the upper end portion of a door inner panel 18 on which the door trim 10 is mounted, as shown in FIG. 3. A weatherstrip 25 which slidably contacts a door glass is provided at the upper end of the raised portion 16.

The door trim 10 is formed from a molded door trim base material 19 made of, for example, a fiber mat, and vinyl chloride sheets 23 respectively bonded to both sides of the material 19, each of the sheets 23 having a foamed material 21 such as polypropylene or polyethylene laminated thereon, the color of the sheets 23 being black or the same as that of the interior skin material.

A square and frame-shaped door grip 22 is mounted at the front end portion of the arm accommodating space 12, whereby it is possible for the occupant to open and close the door by gripping the door grip 22. The door trim 10 is further provided with a lever (not shown) which enables the door to be unlocked. A door built-in type loudspeaker 24 is disposed in front of the door grip 22 in terms of the longitudinal direction of the door. The door grip 22 is fastened by screws at four portions thereof. The rear two of the four portions are screwed to a side wall 26 of the arm accommodating space 12 and are then covered with respective blank caps 28 for the purpose of improving the appearance, while the front two portions are screwed to a bracket 30 used as a fastening apparatus (described later) and are then covered by a loudspeaker grille 32.

The door grip 22 consists of a base material 68 which surrounds a fixed member 52, and a skin material 69 which coats the outside of the base material 68.

Figure 4:
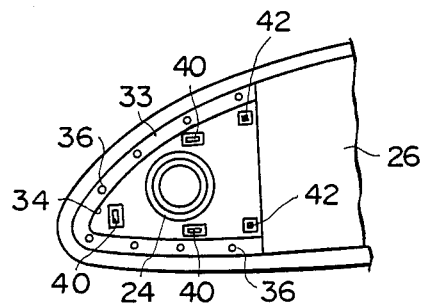
FIG. 4 is a front elevational view of an essential portion of the door trim shown in FIG. 1, with the loudspeaker grille removed.

As shown in FIGS. 3 and 4, a portion of the door trim 10 which is closer to the front end of the vehicle than the door grip 22 is recessed so as to provide a recess 33 for receiving the loudspeaker grille 32, and a triangular opening 34 is provided in the recess 33. The bracket 30 is provided at the opening 34. The bracket 30 has its peripheral edge secured to the door trim 10 by a plurality of screws 36 so that the bracket 30 closes the opening 34 from the rear side thereof.

Figure 2:
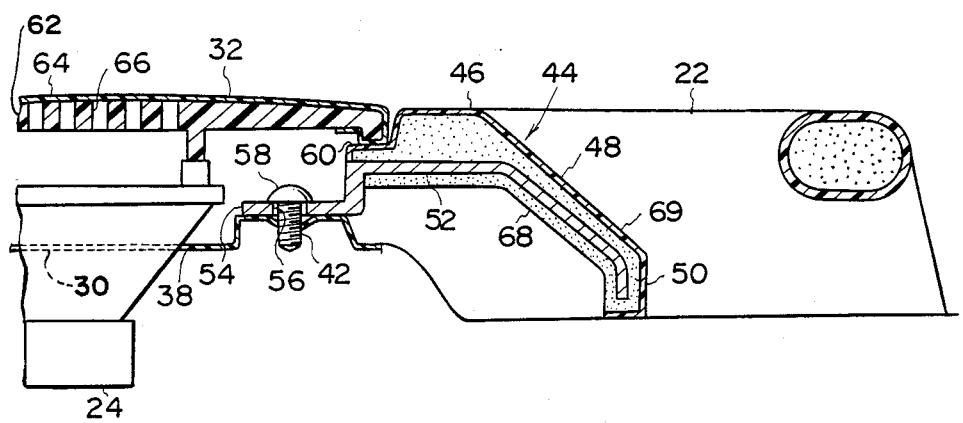
FIG. 2 is a fragmentary sectional view taken along the line II—II of FIG. 1.

A circular bore 38 for receiving a loudspeaker 24 is provided in the center of the bracket 30 (see FIG. 2). Three bores 40 for mounting the loudspeaker grille 32 are provided around the circular bore 38 of the bracket 30 (see FIGS. 3 and 4). Bores 42 for receiving the screws employed to mount the door grip 22 are respectively provided in the upper and lower portions at the rear end of the bracket 30 (see FIGS. 2 and 4). The peripheral edge of each of the bores 40 and 42 projects toward the outside of the vehicle, as shown in FIGS. 2 and 3.

The loudspeaker 24 has the shape of a cone the diameter of which is increased toward the front end from the rear end thereof. Substantially the whole of the loudspeaker 24 is inserted into the circular bore 38 and disposed between the bracket 30 and the door inner panel 18, with only the front end portion thereof left projecting from the bracket 30, so that the front side of the loudspeaker 24 is positioned outside the circular bore 38. The loudspeaker 24 is supported by the loudspeaker grille 32, or is rigidly secured to the bracket 30 or the like.

The left-hand frame 44 (as viewed in FIG. 1) of the door grip 22 consists of, as shown in FIG. 2, an upper frame portion 46, a slanted frame portion 48, and a lower frame portion 50 which abuts against the side wall 26, these portions being integrally formed such as to have a substantially hook-like cross-section as a whole. The rear side of the left-hand frame 44 is so shaped that the lower and left sides thereof are open. The fixed member 52 which is bent in a hook-like shape so as to conform with the shape of the left-hand frame 44 is integrally incorporated inside the frame 44. The left end portion of the fixed member 52 is bent at right angles so as to extend toward the rear side of the door trim 10, and the end portion of this bent portion is further bent at right angles so as to project leftwardly from the upper frame portion 46, thus providing a projecting portion 54. The projecting portion 54 is provided with through-holes 56 which respectively correspond to the screw receiving bores 42 provided in the bracket 30. The left-hand frame 44 is secured to the bracket 30 by means of screws 58 which are screwed into the bores 42 through the through-holes 56, respectively.

The loudspeaker grille 32 is disposed at the front side of the loudspeaker 24. As best seen in FIG. 3, the loudspeaker grille 32 is formed such as to have a plate-like shape which conforms with the shape of the recess 33 for receiving the loudspeaker grille 32. Clip pins 59 are provided on the rear surface of the loudspeaker grille 32 at positions which respectively correspond to the mounting bores 40. Thus, it is possible to mount the loudspeaker grille 32 on the door trim 10 by press-fitting the clip pins 59 into the respective bores 40. The upper and lower peripheral edges of the loudspeaker grille 32 cover the peripheal edge portion of the recess 33 along which the screws 36 are mounted. As shown in FIG. 2, the right end of the loudspeaker grille 32 is disposed such as to extend along a step portion 60 formed on the upper frame portion 46 of the left-hand frame 44, thereby covering the portions thereof at which the screws 58 are mounted. The loudspeaker grille 32 consists of a base material 62 such as a resin member, and a cloth skin material 64. A plurality of bores 66 are provided in a portion of the base material 62 which faces the opening of the loudspeaker 24.

Thus, in accordance with the first embodiment, the door trim is divided into three portions, that is, the raised portion at the upper edge of the door trim, the intermediate portion which includes the arm accommodating space and the armrest, and the lower portion below the armrest, and the loudspeaker is disposed in the intermediate portion and at a position which is on the elongaed portion of the arm accommodating space and closer to the front end of the vehicle than the door grip. In consequence, the loudspeaker is positioned in front of the occupant's breast. Therefore, the sound coming from the loudspeaker is not blocked by the seat or the body of the occupant regardless of whether the seat is slid toward the front or rear end of the vehicle, whether the occupant is seated in the seat in a reclined or upright position, or whether he moves his arm within the arm accommodating space longitudinally or laterally of the vehicle, and the occupant can clearly hear the sound from the loudspeaker which is located close to his ears. In addition, since the sound comes from the front of the listener, he enjoys superior presence in the case of stereo sound.

Further, since the shoulder for reinforcing the door inner panel can be accommodated within the raised portion at the upper end of the door trim which is located above the loudspeaker, the safe strength required for the door can be sufficiently ensured. Since the loudspeaker can be disposed such that it does not overlap the shoulder, there is no increase in the overall width of the door.

Furthermore, the loudspeaker is disposed adjacent to the door grip, and the portion of the door grip at which it is secured to the side wall is covered by the loudspeaker grille. The screws employed to mount the door grip therefore need not be concealed by blank caps or the like. Accordingly, the number of required parts is reduced as compared with the conventional arrangement in which the loudspeaker and the door grip are mounted individually and separately from each other, thus enabling a reduction in costs and an improvement in the appearance of the door trim.

Figure 5:
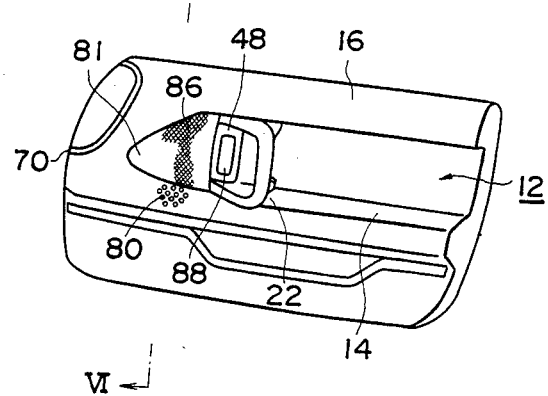
FIG. 5 shows the external appearance of a door trim in accordance with a second embodiment of the present invention.
Figure 6:
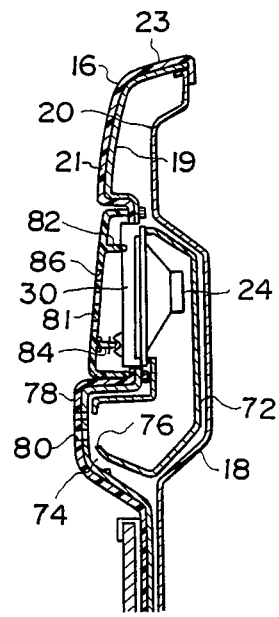
FIG. 6 is a fragmentary sectional view taken along the line VI—VI of FIG. 5.
Figure 7:
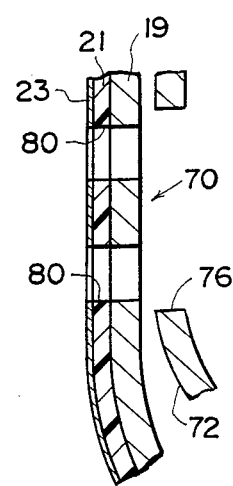
FIG. 7 is an enlarged sectional view of the lower portion of the arm rest of the door trim shown in FIG. 6.

A second embodiment of the present invention will be described below with reference to FIGS. 5 to 7, in which a loudspeaker is housed in a loudspeaker box for improving the acoustic characteristics thereof. The same members or portions in the second embodiment as those in the first embodiment are denoted by the same reference numerals, and detailed description thereof is omitted.

The loudspeaker 24 is, on the whole, disposed at the same position on a door trim 70 as in the case of the first embodiment. The door trim 70 is formed such as to have a shape similar to that of the door trim 10 in the first embodiment. However, the door trim 70 in this embodiment consists of a molded door trim base material 19 and a vinyl choloride sheet 23 which is bonded to only one surface of the base material 19, the sheet 23 having a foamed material 21 laminated thereon (see FIG. 7).

The loudspeaker 24 is mounted in a loudspeaker box 72. The loudspeaker box 72 is mounted within a space which is defined between the door trim 70 and the door inner panel 18 so that the box 72 extends from the rear side of the loudspeaker 24 to an armrest space 74 defined inside the armrest 14. The loudspeaker box 72 has an acoustic path having a length corresponding to a predetermined wavelength and is provided with an acoustic opening or port 76 for intensifying low audio frequencies so that the opening 76 faces an armrest side wall 78 of the armrest 14. The armrest side wall 78 is formed such as to have a curved surface and has a plurality of bores 80 provided in a portion thereof which faces the opening 76 by means, for example, of punching. The bores 80 are formed directly in the door trim 70. It is preferable to set the diameter of each bore 80 at about 4 mm and the pitch between each pair of adjacent bores 80 at about 10 mm from the viewpoint of the rigidity of the door trim 70, the acoustic characteristics of the loudspeaker 24 and the appearance of the door trim 70.

The loudspeaker box 72 is screwed to the door trim 70 (the way in which the loudspeaker box 72 is secured to the door trim 70 is not shown). A loudspeaker grille 81 is provided in front of the loudspeaker 24, the grille 81 being press-fitted to the bracket 30 by pins. The upper pin shown in FIG. 6 is a straight pin 82, while the lower pin is a clip pin 84. A plurality of bores 86 are provided in a portion of the loudspeaker grille 81 which faces the opening of the loudspeaker 24. A control switch board 88 which incorporates, for example, a switch for vertically moving the door glass, is provided on the slanted frame portion 48 of the door grip 22.

According to the second embodiment, a volume adequate for the loudspeaker box can be ensured by utilizing the space inside the armrest. It is therefore possible to improve the acoustic characteristics of the loudspeaker without any increase in the overall width of the door.

Since the function of the loudspeaker grille in relation to the acoustic opening or port provided in the loudspeaker box is effected by a pluality of bores provided in the door trim, it is not necessary to mount a grille at a curved portion which involves difficulty in effecting geometrical alignment, and the arrangement is simplified. Since no special space is required for providing a grille, it is possible to obtain a maximized effective opening area within a limited space inside the armrest side wall, so that the quality of sound can be improved with certainty. Further, since no hard foreign matter such as a resin member or an iron sheet for forming a grille or a bracket is provided at the armrest which may be touched when the occupant stretches his hand, there is no fear of the occupant feeling a pain when touching the armrest. In addition, since no grille which is a separate member is disposed near the occupant's body (particularly, his legs), it is possible to prevent deterioration of the aesthetic quality of the interior of the vehicle.

As has been described above, the door built-in type loudspeaker in accordance with the present invention is provided in the intermediate portion of the door trim in terms of the vertical direction of the door. Therefore, the sound produced from the loudspeaker is not blocked by the occupant's legs and waist, which may be close to the lower portion of the door trim, or by the waist level portion of the seat. Further, since the loudspeaker is provided at a position on the door trim which is closer to the front end of the vehicle than the door grip, the sound from the loudspeaker directly enters the occupant's ears from his front without being blocked by the upper half of his body, for example, the arm placed within the arm accommodating space of the door trim, or by the back-rest of the seat. In consequence, it is possible for the occupant to clearly listen to the sound from the loudspeaker with the benefit of presence. In addition, since a space is left inside the upper portion of the door trim, it is possible to form a shoulder for reinforcing the door inner panel in this space without any interference with the loudspeaker, thereby allowing the door to possess adequate strength. Further, since the loudspeaker is positioned below the reinforcing shoulder, there is no increase in the overall width of the door.

What is claimed is:

1. A door for a vehicle which incorporates a loudspeaker, comprising:

a door trim disposed at the innermost side of said door and having a raised portion which extends horizontally along an upper edge of said door trim, and an armrest portion which extends horizontally along an approximate longitudinal centerline of said door trim, said door trim having a recess forming a channel which extends substantially horizontally from a rear end of said door trim at a position slightly closer to the upper edge of said door trim than the centerline of said door trim and which terminates at a position adjacent a front end of said door trim, said raised portion forming an upper channel wall of said recess and said armrest portion forming a lower channel wall of said recess;

a door grip extending between said upper and lower channel walls and located adjacent to a front terminating position of said recess for grasping by an occupant to open and close said door; and a loudspeaker secured to said door trim and said door grip such that said loudspeaker is disposed between the front terminating position of said recess and said door grip and between said upper and lower channel walls.

2. A door for a vehicle according to claim 1, further comprising a bracket disposed at a position at which said loudspeaker is positioned, said bracket being secured to said door trim and having a bore for retaining said loudspeaker.

3. A door for a vehicle according to claim 2, wherein a front end portion of said door grip is secured to said bracket.

4. A door for a vehicle according to claim 3, further comprising a loudspeaker grille mounted on said door trim so as to cover a front side of said loudspeaker, and wherein said loudspeaker grille also covers said front end portion of said door grip which is secured to said bracket.

5. A door for a vehicle according to claim 4, wherein a projecting shoulder portion for reinforcing an inner panel of said door is positioned inside said door adjacent said raised portion of said door trim.

6. A door for a vehicle which incorporates a loudspeaker, comprising:

a door trim disposed at the innermost side of said door and having a raised portion which extends horizontally along an upper edge of said door trim, and an armrest portion which extends horizontally along an approximate center-line of said door trim, said door trim having a recess forming a channel which extends substantially horizontally from a rear end of said door trim at a position slightly closer to the upper edge of said door trim than the center-line of said door trim and which terminates at a position adjacent a front end of said door trim, said raised portion forming an upper channel wall of said recess and said armrest portion forming a lower channel wall of said recess;

a door grip extending between said upper and lower channel walls and located adjacent a front terminating position of said recess for grasping by an occupant to open and close said door;

a loudspeaker secured to said door trim and said door grip such that said loudspeaker is disposed between the front terminating position of said recess and said door grip and between said upper and lower channel walls; and a loudspeaker box disposed between said door trim and an inner panel of said door so as to extend from a bottom side of said loudspeaker inside said armrest, said loudspeaker box having an acoustic opening for intensifying a predetermined acoustic frequency range, said acoustic opening being positioned below said loudspeaker and a plurality of bores provided on the door trim, said bores facing said acoustic opening.

7. A door for a vehicle according to claim 6, further comprising a bracket disposed at a position at which said loudspeaker is positioned, said bracket being secured to said door trim and having a bore for retaining said loudspeaker.

8. A door for a vehicle according to claim 7, wherein a front end portion of said door grip is secured to said bracket.

9. A door for a vehicle according to claim 8, further comprising a loudspeaker grille mounted on said door trim so as to cover a front side of said loudspeaker, and wherein said loudspeaker grille also covers said front end portion of said door grip which is secured to said bracket.

10. A door for a vehicle according to claim 9, wherein a projecting shoulder portion for reinforcing an inner panel of said door is positioned inside said door adjacent said raised portion of said door trim.

11. A door for a vehicle which incorporates a loudspeaker comprising:

a door trim having:

a protruded portion extending horizontally and longitudinally along an upper edge of the door trim, said protruded portion comprising an upper wall, a side vertical wall and a lower wall adjoining the side vertical wall;

an armrest disposed horizontally and longitudinally under said protruded portion with an exterior space defined between said lower wall of said protruded portion and said armrest, said armrest defining an interior space between said armrest and a door inner panel, forward and rearward ends of said armrest being connected to and adjoining corresponding forward and rearward ends of the protruded portion;

a recess formed horizontally in said exterior space between said protruded portion and armrest;

a door grip located in said recess at a predetermined forward porton of said recess, said door grip fastened to said door trim at a fastening portion;

a loudspeaker disposed in an opening in said recess, said loudspeaker surrounded by said door grip and both forward ends of the protruded portion and armrest, said loudspeaker having inner and outer sides;

a loudspeaker box disposed in said interior space between said armrest and door inner panel, said loudspeaker box being secured on an inner side of the loudspeaker so as to enhance acoustic characteristics; and a plurality of bores extending through the door trim adjacent to the loudspeaker and communicating with said speaker box whereby a low audio frequency effect is intensified.

12. A door for a vehicle according to claim 11, wherein a loudspeaker grille of said loudspeaker is substantially aligned with the side vertical wall of the protruded portion of said door trim.

13. A door for a vehicle according to claim 11, further comprising a fastening apparatus for securing said loudspeaker, the fastening apparatus being a bracket disposed inside the door trim, the loudspeaker being secured to the bracket.

14. A door for a vehicle according to claim 13 wherein an end of said door grip is secured to said bracket.

15. A door for a vehicle according to claim 11, further comprising a loudspeaker grille securely mounted on the door trim so as to cover an outer side of the loudspeaker and the fastened portion of the door grip on the door trim.

16. A door for a vehicle according to claim 11, further comprising a projected shoulder for reinforcing an inner panel of said door disposed inside said protruded portion between the door trim and a door outer panel.

* * * * *